United States Patent
Sanjay (10) Patent No.: US 10,403,281 B1
(45) Date of Patent: Sep. 3, 2019

(54) METHOD AND SYSTEM FOR VOICE BASED PROVISIONING OF OPTIMIZED RESOURCES IN A CLOUD ENVIRONMENT

(71) Applicant: WIPRO LIMITED, Bangalore (IN)

(72) Inventor: Sanjay, Kurukshetra (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/936,467

(22) Filed: Mar. 27, 2018

(30) Foreign Application Priority Data

Feb. 12, 2018 (IN) .............................. 201841005284

(51) Int. Cl.
| | | |
|---|---|---|
| G10L 15/00 | (2013.01) | |
| G10L 15/22 | (2006.01) | |
| G10L 15/14 | (2006.01) | |
| G10L 15/16 | (2006.01) | |
| G10L 15/30 | (2013.01) | |
| G10L 15/26 | (2006.01) | |
| G10L 15/08 | (2006.01) | |

(52) U.S. Cl.
CPC .......... G10L 15/22 (2013.01); G10L 15/142 (2013.01); G10L 15/16 (2013.01); G10L 15/30 (2013.01); *G10L 2015/088* (2013.01)

(58) Field of Classification Search
CPC ......... G10L 15/22; G10L 15/30; G10L 15/16; G10L 15/142; G10L 2015/088
USPC .................................. 704/231, 235, 246, 251
See application file for complete search history.

(56) References Cited

U.S. PATENT DOCUMENTS

2015/0288678 A1    10/2015    Chen

FOREIGN PATENT DOCUMENTS

| CN | 106357609 | 1/2017 |
|---|---|---|
| CN | 107040518 | 8/2017 |

*Primary Examiner* — Thierry L Pham
(74) *Attorney, Agent, or Firm* — Finnegan, Henderson, Farabow, Garrett & Dunner, LLP (57) ABSTRACT

Systems and methods for provisioning optimized resources in a cloud environment are described. The system receives voice-based user input for accessing resources in the cloud environment. The voice input is converted into textual data from which one or more keywords are identified. Further, the system automatically determine one or more parameters and corresponding one or more values of the one or more parameters required for accessing the resources based on the one or more keywords. These one or more values are populated in one or more fields corresponding to the one or more parameters. The one or more values indicates an optimal machine configuration of the resource. Further, the system provisions the optimized resource based on the populating of the one or more values in the one or more fields.

20 Claims, 4 Drawing Sheets

METHOD AND SYSTEM FOR VOICE BASED PROVISIONING OF OPTIMIZED RESOURCES IN A CLOUD ENVIRONMENT

TECHNICAL FIELD

The present disclosure relates in general to cloud provisioning. More particularly, but not exclusively, the present disclosure discloses a method and system for provisioning of resources in a cloud environment based on voice based input.

BACKGROUND

In recent past, cloud provisioning has become very much popular in computing environment. In the cloud provisioning, various resources are allocated to users/customers based on their request. However, for raising such request for accessing the resource on the cloud, the user has to manually select various catalogs which is not only tedious and time consuming process but it also requires technical skills from the user. Hence, it creates a challenge for non-technical users having no/limited knowledge of technical features/configurations of the resources while selecting the catalogs manually.

Even for the technical users, sometimes it becomes a challenge to appropriately select the catalogs. The users may not know what would be an ideal configuration of resources/machines which they wish to access. This creates a technical problem in a field of cloud provisioning. That is, the users (both technical and non-technical) may select a higher configuration resource which involve extra cost, or may select a resource having lesser computing capacity which may not match with actual requirements of users, thereby leading to a poor performance of the resource.

Additionally, manual selection of the catalogs and entering the various fields of a form presented for receiving parameters and configuration for provisioning may serve as an added overhead for the non-technical user. This is because, such a user may not be aware about each and every fields to be filled in the form to access the database server and consequently may select incorrect configuration for the cloud which may lead to several performance issues in a database server being used for said provisioning.

Furthermore, many companies offer technical support for such provisioning, over the cloud, and some may even offer live operator assistance for user's queries. However, it is an extremely costly and inefficient method, because a real person must be employed to handle such queries. This presents a practical limit that results in long wait times for responses or high labor overheads. Therefore, there is a requirement for having a mechanism for performing provisioning in the cloud environment that is efficient and requires minimal manual effort from the user that performs such provisioning.

SUMMARY

The present disclosure relates to a method of provisioning optimized resources in a cloud environment. The method includes receiving a voice-based user input for accessing resources in the cloud environment. The method further includes identifying one or more keywords related to the resources from the voice-based user input. The method further includes determining automatically one or more parameters and corresponding one or more values of the one or more parameters required for accessing the resources based on the one or more keywords. The method further includes populating, one or more fields, corresponding to the one or more parameters, with the one or more values. The one or more values indicates an optimal machine configuration of the resources. The method further includes provisioning the optimized resources based on the populating of the one or more values in the one or more fields.

Further, the present disclosure relates to a resource provisioning system for provisioning optimized resources in a cloud environment. The system comprises a processor and a memory communicatively coupled to the processor. The memory stores processor-executable instructions, which, on execution, causes the processor to receive a voice-based user input for accessing resources in the cloud environment. The processor further identifies one or more keywords related to the resources from the voice-based user input. Further, the processor determines automatically one or more parameters and corresponding one or more values of the one or more parameters required for accessing the resources based on the one or more keywords. The processor further populates one or more fields, corresponding to the one or more parameters, with the one or more values. The one or more values indicates an optimal machine configuration of the resources. Further, the processor provisions the optimized resources based on the populating of the one or more values in the one or more fields.

Furthermore, the present disclosure relates to a non-transitory computer readable medium including instructions stored thereon that when processed by at least one processor cause a resource provisioning system to perform the acts of receiving a voice-based user input for accessing resources in the cloud environment. The instructions further cause the at least one processor to identify one or more keywords related to the resources from the voice-based user input. Further, the instructions cause the at least one processor to determine automatically one or more parameters and corresponding one or more values of the one or more parameters required for accessing the resources based on the one or more keywords. The instructions further cause the at least one processor to populate one or more fields, corresponding to the one or more parameters, with the one or more values. The one or more values indicates an optimal machine configuration of the resources. The instructions further cause the at least one processor to provision the optimized resources based on the populating of the one or more values in the one or more fields.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a system for provisioning optimized resources in a cloud environment. Although, the method for provisioning the optimized resources in a cloud environment is described in conjunction with a server, the said method can also be implemented in various computing systems/devices, other than the server. Cloud provisioning facilitates provisioning of resources or virtual machines to users. For accessing the resources on the cloud, conventionally, the users have to make a request by manually selecting catalogs or by filling details in forms/ fields. Selecting catalogs/filling details in the forms/fields requires technical knowledge of resource/machine to be accessed. As discussed earlier, if the catalogs are not appropriately selected, it may lead to higher cost or poor performance of the selected resource.

The present disclosure overcome this issue by eliminating the dependency of selecting the catalogs from the users. In other words, the present disclosure aims to automate the process of selecting of catalogs/filling of forms based on voice input of users. By facilitating the voice based mechanism, the requirement of having the technical knowledge for appropriately selecting the catalogs is eliminated. Now, once the system receives the voice-based user input requesting to access a particular type of resource (e.g., MS SQL database), the system converts the voice-based user input into textual data. From the textual data, keywords are identified which reflects the service requested for accessing the resources. For example, in this case, the keywords may be "MS", "Microsoft", "SQL" "structured query language", "standardized query language".

Based on keywords identified, the system, without taking any manual input, automatically determines one or more parameters and corresponding values of the one or more parameters. As an example, the one or more parameters may comprise at least one of Central Processing Unit (CPU) count, Random Access Memory (RAM) size, hard disk size, security zone, active directory (AD) domain, server type, service level agreement (SLA), default username, and password. The values of the parameters indicates the optimal machine configuration of the resources to be accessed/ provisioned. To complete the provisioning process, the system now populates different fields of an automatically generated form, corresponding to the parameters, with the values of the parameters. Once the values are populated in the fields, the system provisions the optimized resource. Now the user can access the resource on the cloud environment. The above discussed process from determining the one or more parameters and corresponding values till provisioning of the optimized resource may be triggered based on a dynamically generated workflow. This way, the entire process of provisioning of the resources may be automated without requiring the manual input, which is explained in detail in subsequent paragraphs of the specification.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
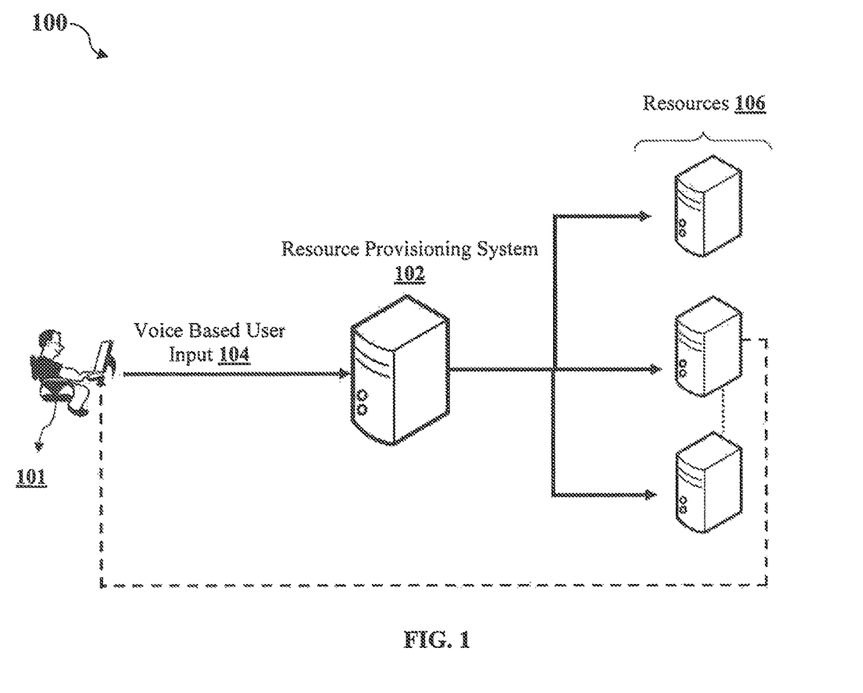
FIG. 1 is an exemplary environment illustrating a resource provisioning system for provisioning optimized resources in a cloud environment, in accordance with some embodiments of the present disclosure.

FIG. 1 is an exemplary environment illustrating a resource provisioning system for provisioning optimized resources in a cloud environment in accordance with some embodiments of the present disclosure.

The environment 100 includes a resource provisioning system 102, a voice-based user input 104, resources 106. According to embodiments, when a user 101 wishes to access resources provided on the cloud (public or private cloud) may send the request in a form of voice input (voice-based user input 104) rather than manually selecting each and every catalog or filling details in each and every form or field. By implementing the voice-based user input 104, it becomes easier for non-technical users having less or no technical knowledge to access the resource on the cloud. Further, it may help in identifying the most optimized resource amongst the available resources 106, thereby improving the overall user experience.

The voice-based user input 104, received from the user 101, is converted into textual format by using a speech convertor 206 of the resource provisioning system 102.

From the textual format, the system 102 identifies one or more keywords for determining one or more parameters and corresponding values of the one or more parameters. These values may indicate the optimal machine configuration of the optimized resource. Once the values are determined, the fields corresponding to the parameters are populated by the corresponding values for provisioning the optimized resource to the user 101.

Figure 2:
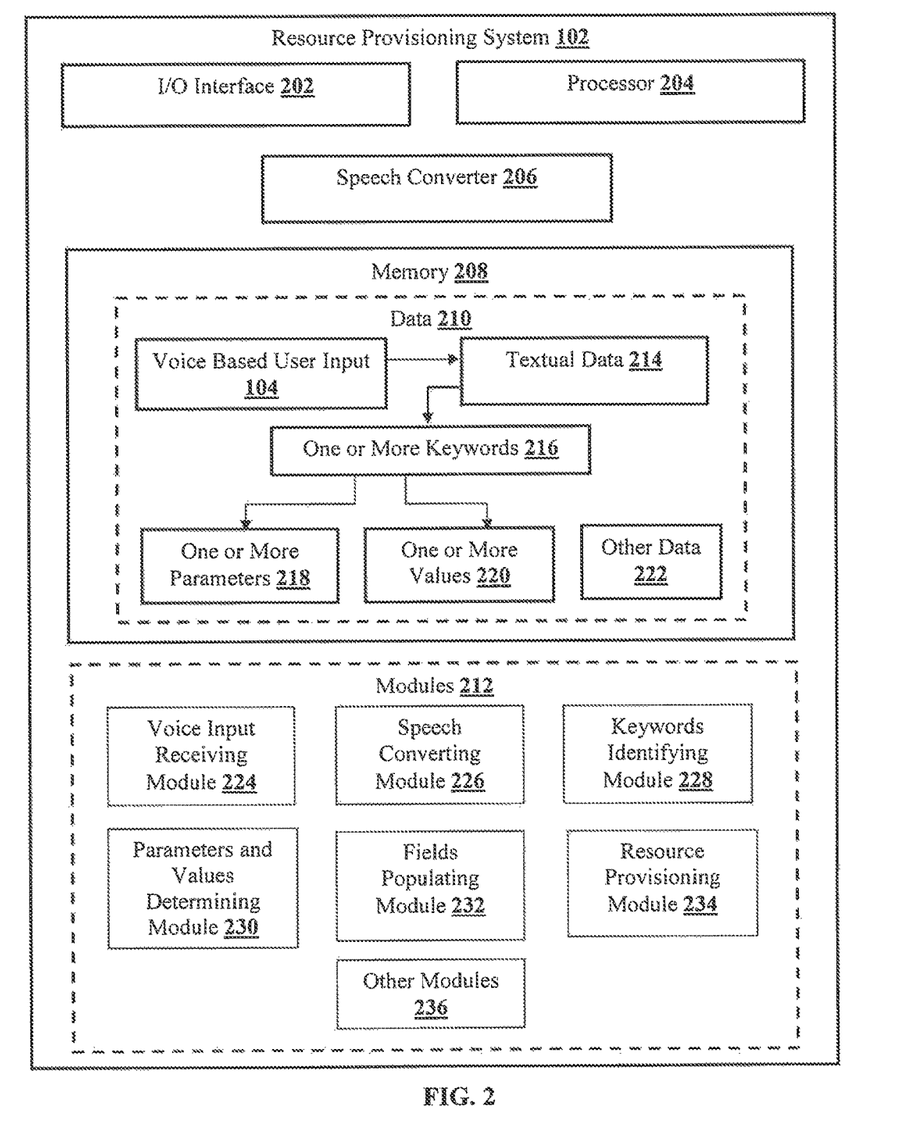
FIG. 2 is a detailed block diagram illustrating the resource provisioning system, in accordance with some embodiments of the present disclosure.

FIG. 2 is a detailed block diagram illustrating the resource provisioning system in accordance with some embodiments of the present disclosure.

The resource provisioning system 102 comprises an I/O interface 202, a processor 204, a speech convertor 206, and a memory 208. The memory 208 is communicatively coupled to the processor 204. The processor 204 is configured to perform one or more functions of the resource provisioning system 102 for provisioning optimized resources in a cloud environment. In one implementation, the resource provisioning system 102 may include data 210 and modules 212 for performing various operations in accordance with the embodiments of the present disclosure. In an embodiment, the data 210 may be stored within the memory 208 and may include, without limitation, a voice-based user input 104, textual data 214, one or more keywords 216, one or more parameters 218, one or values 220 corresponding to the one or more parameters 218, and other data 222.

In one embodiment, the data 210 may be stored within the memory 208 in the form of various data structures. Additionally, the aforementioned data 210 can be organized using data models, such as relational or hierarchical data models. The other data 222 may store data, including temporary data and temporary files, generated by the modules 212 for performing the various functions of the resource provisioning system 102.

In an embodiment, the voice-based user input 104 is an input received from the user 101 requesting an access of a resource in the cloud environment. Rather than typing or filling details, the user 101 may simply input voice based instructions through an electronic device such as mobile phone, computer system and the like which is received by the resource provisioning system 102.

In an embodiment, the textual data 214 is the textual format of the voice-based user input 104. The resource provisioning system 102 may use the speech convertor 206 to convert the voice-based user input 104 into the textual format. In an embodiment, the one or more keywords 216 are identified from the textual data 214 by applying identifier on the textual data 214. The identifier may comprise at least one of a Rapid Automatic Keyword Extraction (RAKE) method and a Key Phrase Extraction Algorithm (KEA). Further, the one or more keywords 216 are associated with a service requested for accessing the resources 106.

In an embodiment, the one more parameters 218 and the one or more values 220 are automatically determined based on the one or more keywords 216. The one more parameters 218 may comprise, but not limited to, Central Processing Unit (CPU) count, Random Access Memory (RAM) size, hard disk size, security zone, active directory (AD) domain, server type, service level agreement (SLA), default username, and password. Further, the one or more values 220 are the corresponding values of the one or more parameters 218.

In some embodiments, the data 210 may be processed by one or more modules 212 of the resource provisioning system 102. In one implementation, the one or more modules 212 may be stored as a part of the processor 204. In another implementation, the one or more modules 212 may be communicatively coupled to the processor 204 for performing one or more functions of the resource provisioning system 102. The modules 212 may include, without limiting to, a voice input receiving module 224, a speech converting module 226, an keywords identifying module 228, a parameters and values determining module 230, a fields populating module 232, a resource provisioning module 234, and other modules 236.

As used herein, the term 'module' refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 236 may be used to perform various miscellaneous functionalities of the resource provisioning system 102. It will be appreciated that such modules 236 may be represented as a single module or a combination of different modules.

In an embodiment, the voice input receiving module 224 may receive the voice-based user input 104 from a user 101 through the I/O interface 202. The voice-based user input 104 indicates the user's 101 request for accessing the resources 106 on the cloud. The user 101 may be technical or non-technical user or any other user who may wish to access the resource/virtual machine on the cloud. To some extent, the technical users may be comfortable doing this manual task as long as they have the technical knowledge about machine's configuration. However, the non-technical users becomes completely clueless when they have to provide each and every technical details for completing their request. According to embodiments of present disclosure, the technical details may comprises details like machine configuration of the resources (e.g., server). This not only results in wasting time and effort while filling the details, but it also leads to poor performance of the resource provisioned to the user 101. For example, the user 101 may select a low configuration resource (e.g., having less RAM size and lower computing power) for performing computation intensive task.

To overcome the above technical challenge, the present disclosure discloses a mechanism, in which, the users rather than typing or filling details in the form, simply provide their voice input for requesting the service. This eliminates the requirement of having the technical knowledge about the resources which the users wishes to access. The voice-based user input 104 may be provided by the user 101 through a microphone of the user's 101 device. The user device is associated with the resource provisioning system 102 using a wired or a wireless connection. The voice input receiving module 224 of the resource provisioning system 102 receives the voice-based user input 104 from the user device.

In an embodiment, the speech converting module 226 which may be a speech convertor 206 which converts the voice-based user input 104 into the textual data 214. According to embodiments of present disclosure, the conversion of the voice-based user input 104 into the textual data 214 is based on different models like an acoustic model, a language model, a pronunciation model. Examples of such models comprises a Hidden Markov method, a Dynamic Time Warping (DTW) method, an artificial neural network, an end-to-end Automatic Speech Recognition (ASR) method, a deep feedforward network, and a Recurrent Neural Network (RNN). According to embodiments, these models can be specialized for a given language, dialect, application domain, type of speech, and communication channel in order to get the best transcription quality of the voice-based user input 104 received from the user 101.

Now the next task is to identify or extract relevant keywords from the textual data 214. In an embodiment, the keywords identifying module 228 of the resource provisioning system 102 applies an identifier on the textual data 214 to identify the one or more keywords 216. These keywords are associated with the resource requested by the user 101. Considering an example, in which, the user 101 has requested for accessing "Windows server 2012 R2", the one or more keywords 216 extracted may comprise machine name, a user name and a password. According to embodiments of the present disclosure, the identifier applied for identifying the one or more keywords 216 may comprise at least one of a Rapid Automatic Keyword Extraction (RAKE) method and a Key Phrase Extraction (KEA) method.

Once these keywords 216 are identified, the resource provisioning system 102 gets an idea about the type of the resource the user 101 is looking for. In the example considered in previous paragraph, the resource provisioning system 102 is able to understand that the user 101 is looking for Microsoft™ server operating system of version 2012. The resource provisioning system 102 also interprets the code "R2" and understand that user 101 is looking for release 2 of the windows server 2012. This information helps in determining optimal configuration of the resource to be provisioned to the user 101, or in other words, identifying the appropriate resource which meets the requirement of the user 101.

Now based on the aforementioned information, since the resource provisioning system 102 understands the actual requirement of the user 101, the parameters and values determining module 230 automatically determines the one or more parameters 218 and corresponding one or more values 220 of the one or more parameters 218 required for accessing the resources 106 based on the one or more keywords 216. The example of the determined one or more parameters 218 and the corresponding one or more values 220 for the Windows server 2012 R2 have been shown in below table 1.

| Parameters | Values of the parameters |
|---|---|
| Central Processing Unit (CPU) count | 2 |
| Random Access Memory (RAM) size, | 2048 MB |
| Hard disk size | 40 GB |

Table 1—The one or more parameters and corresponding one or more values.

From the above table 1, it can be observed that the one or more parameters 218 determined for the resource "Windows server 2012 R2" are the CPU count, RAM size, and Hard disk size. It must be understood to a person skilled in art that other parameters may also be determined based on type of the resource to be provisioned to the user 101. The other parameters may include, but not limited to, security zone, active directory (AD) domain, server type, service level agreement (SLA), default username, password and the like which depends on the type of resource being requested. It can be also observed from the above table 1 that the one or more values 220 corresponding to the one or more parameters 218 are determined by the resource provisioning system 102. For example, the value for the parameter "CPU count" is "2", the value of the parameter "RAM size" is "2048 MB", and the value of the parameter "Hard disk size" is "40 GB".

These one or more values 220 are nothing but the optimal machine configuration of the resource to be provisioned to the user 101. According to an embodiment, these one or more values 220 are determined based on recommendation of a service provider associated with the optimized resource. In this case, the recommendation of the one or more values 220 may be provided by the service provider Microsoft™. This way, the burden of identifying the optimal resource amongst the available resources is removed at user's end. However, these values need to be filled in a form for completing the request and for making the resource provisioning system 102 to trigger the request. To achieve this, one or more fields may be generated in the form corresponding to the one or more parameters 218.

To complete the request, the fields populating module 232 of the resource provisioning system 102 may populate the one or more values 220 in the one or more fields. Once the one or more values 220 are populated, the resource provisioning module 234 provisions the optimized resource, amongst the available resources 106, to the user 101.

In an alternative embodiment of present disclosure, the resource provisioning system 102 may dynamically generate a workflow corresponding to the identified one or more keywords 216. The workflow is a set of automated steps performed by the resource provisioning system 102 for provisioning the optimized resource. In other words, once the workflow is generated, it triggers the provisioning of the optimized resource. Referring back to the above example of "Windows server 2012 R2", as soon as the one or more keywords 216 are identified, the resource provisioning system 102 automatically generates a workflow for provisioning the optimized resource. The workflow generated may comprises a series of tasks to be performed by the resource provisioning system 102. For example, the first task may trigger the resource provisioning system 102 to determine the one or more parameters 218 and corresponding one more values 220 from the identified one or more keywords 216. The one or more parameters 218 and the one more values 220 can be seen from the above table 1. As explained above, the workflow ensures that the one or values 220 generated should be an optimal configuration of the resource to be provisioned.

In next step, the workflow may now trigger the resource provisioning system 102 to populates the one or more values 220 into one or fields of an automatically generated form. Once the fields are populated, the next task of the workflow enables the provisioning of the optimized resource to the user. This way, the entire process from determining the one or more parameters 218 and the corresponding one or more values 220 till the provisioning of the optimized resource is triggered by the workflow.

It must be noted to person skilled in art that workflow may be generated based on service requested by the user. For example, in above case, the workflow generated is related to "Windows server 2012 R2". However, if the user changes his/her requirement, for example user now wants to access "Linux server", then an another workflow is generated which comprises a series of task from determining of parameters and values till identifying and provisioning of an optimized Linux server amongst the available Linux servers on the cloud.

Figure 3:
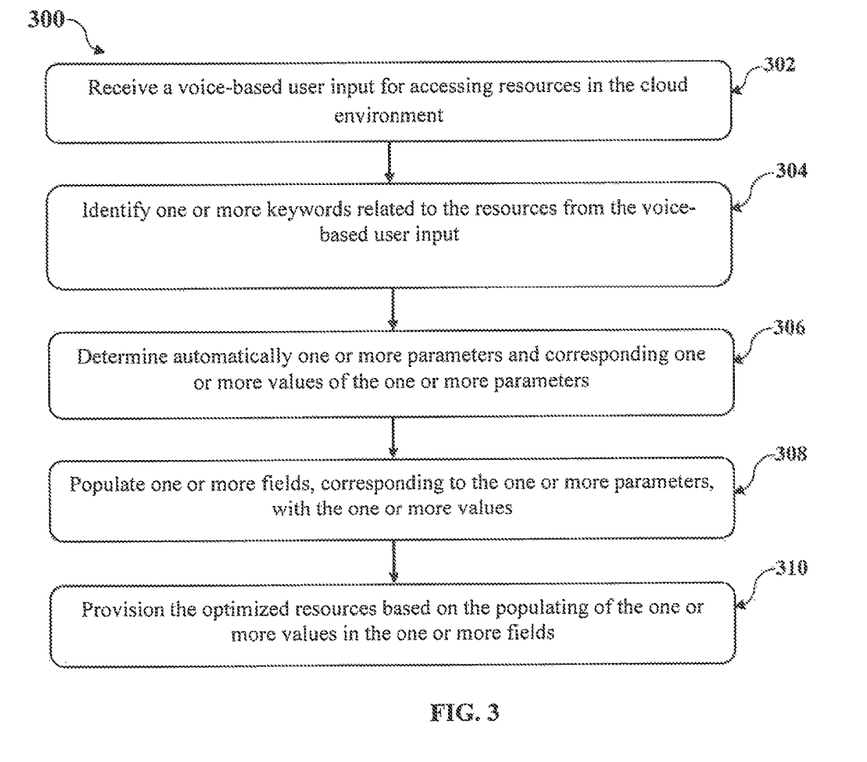
FIG. 3 is a flowchart illustrating a method for provisioning optimized resources in a cloud environment, in accordance with some embodiments of the present disclosure.

FIG. 3 is a flowchart illustrating a method for provisioning optimized resources in a cloud environment in accordance with some embodiments of the present disclosure.

As illustrated in FIG. 3, the method 300 comprises one or more blocks for provisioning optimized resources in a cloud environment using a resource provisioning system 102. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 302, the method 300 includes receiving, by the resource provisioning system 102, a voice-based user input 104 for accessing resources 106 in the cloud environment. The voice-based user input 104 may be provided by the user 101 through a microphone of the user's device. The user device is associated with the resource provisioning system 102 using a wired or a wireless connection. The voice input receiving module 224 of the resource provisioning system 102 receives the voice-based user input 104 from the user device.

At block 304, the method 300 includes identifying, by the resource provisioning system 102, one or more keywords 216 related to the resources 106 from the voice-based user input 104. According to embodiments, the one or more keywords 216 are identified by applying an identifier on the textual data 214. The identifier applied for identifying the one or more keywords 216 comprises at least one of a Rapid Automatic Keyword Extraction (RAKE) method and a Key Phrase Extraction (KEA) method.

At block 306, the method 300 includes determining, by the resource provisioning system 102, automatically one or more parameters 218 and corresponding one or more values 220 of the one or more parameters 218 required for accessing the resources 106 based on the one or more keywords 216. According to embodiments, the one or more parameters 218 comprises at least one of Central Processing Unit [CPU] count, Random Access Memory [RAM] size, hard disk size, security zone, active directory (AD) domain, server type, service level agreement (SLA), default username, and password.

At block 308, the method 300 includes populating, by the resource provisioning system 102, one or more fields, corresponding to the one or more parameters 218, with the one or more values 220. The one or more values 220 indicates an optimal machine configuration of the resources 106.

At block 310, the method 300 includes provisioning, by the resource provisioning system 102, the optimized resource based on the populating of the one or more values 220 in the one or more fields.

Figure 4:
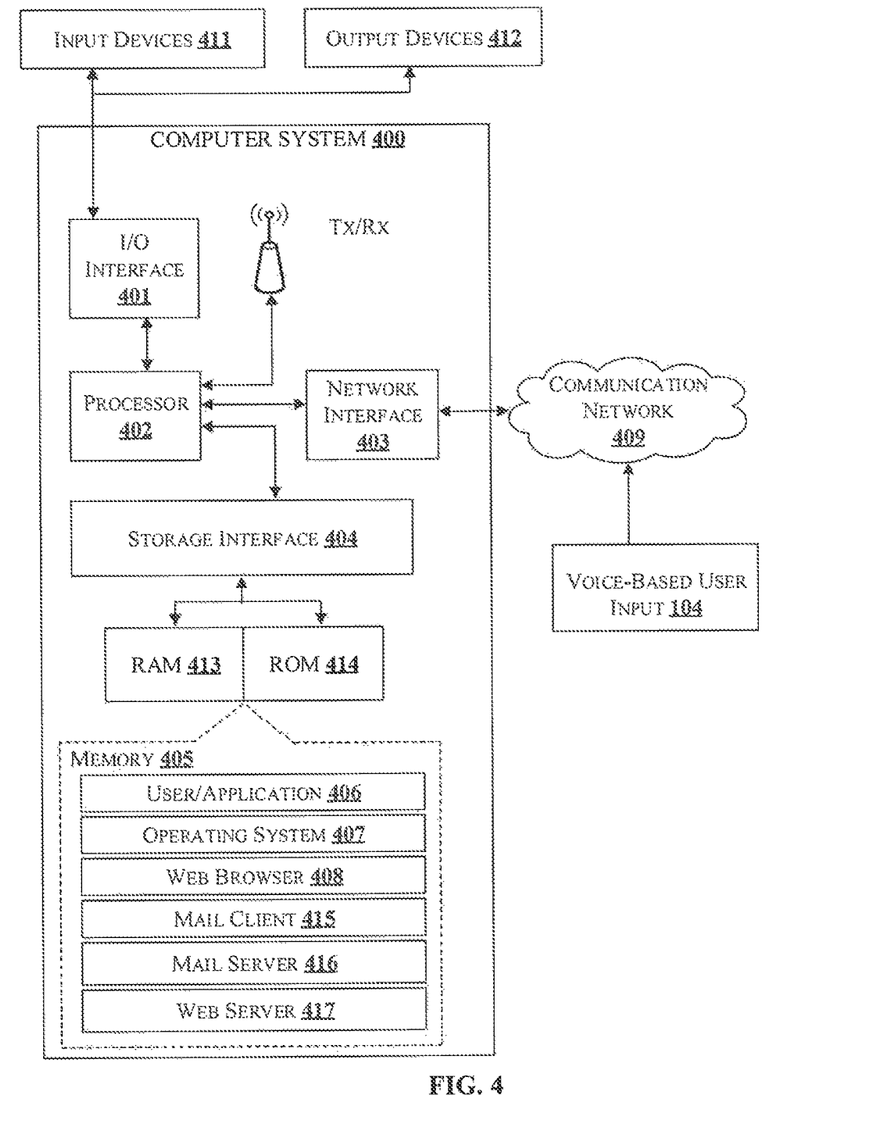
FIG. 4 is a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 can be the system 102 which is used for provisioning optimized resources in a cloud environment. According to an embodiment, the computer system 400 may receive voice-based user input 104 from an user 101 requesting to access a resource in the cloud environment. The computer system 400 may comprise a central processing unit ("CPU" or "processor") 402. The processor 402 may comprise at least one data processor for executing program components for executing user- or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application data 406, an operating system 407, web browser 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/ 7/8, etc.), Apple iOS, Google Android, Blackberry Operating System (OS), or the like. I/O interface 401 may facilitate display, execution, interaction, manipulation, or operation of program components through textual or graphical facilities. For example, I/O interface may provide computer interaction interface elements on a display system operatively connected to the computer system 400, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, Common Gateway Interface (CGI) scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method of automatically provisioning an optimized resource to the user based on voice input.

In an embodiment, the method of present disclosure simplifies the process of requesting for cloud provisioning for user.

In an embodiment, the method of present disclosure identifies an optimized resource, amongst the available resources, which not only meet user's requirement but also helps in improving overall performance of resource allocated to the user.

In an embodiment, the methods of present disclosure helps in complying with service level agreement (SLA), thereby preventing breaching of the SLA.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
| --- | --- |
| Reference Number | Description |
| 100 | ENVIRONMENT |
| 102 | RESOURCE PROVISNIONNG SYSTEM |

-continued

Referral Numerals:

| Reference Number | Description |
| --- | --- |
| 104 | VOICE-BASED USER INPUT |
| 106 | RESOURCES |
| 202 | I/O INTERFACE |
| 204 | PROCESSOR |
| 206 | SPEECH CONVERTOR |
| 208 | MEMORY |
| 210 | DATA |
| 212 | MODULES |
| 214 | TEXTUAL DATA |
| 216 | ONE OR MORE KEYWORDS |
| 218 | ONE OR MORE PARAMETERS |
| 220 | ONE OR MORE VALUES |
| 222 | OTHER DATA |
| 224 | VOICE INPUT RECEIVING MODULE |
| 226 | SPEECH CONVERTING MODULE |
| 228 | KEYWORDS IDENTIFYING MODULE |
| 230 | PARAMETERS AND VALUES DETERMINING MODULE |
| 232 | FIELDS POPULATING MODULE |
| 234 | RESOURCE PROVISIONING MODULE |
| 236 | OTHER MODULES |

The invention claimed is:

1. A method for provisioning optimized resources in a cloud environment, wherein the method comprising:
receiving, by a resource provisioning system, a voice-based user input for accessing resources in the cloud environment;
identifying, by the resource provisioning system, one or more keywords related to the resources from the voice-based user input;
determining automatically, by the resource provisioning system, one or more parameters and corresponding one or more values of the one or more parameters required for accessing the resources based on the one or more keywords;
populating, by the resource provisioning system, one or more fields, corresponding to the one or more parameters, with the one or more values, wherein the one or more values indicates an optimal machine configuration of the resources; and
provisioning, by the resource provisioning system, the optimized resources based on the populating of the one or more values in the one or more fields.

2. The method as claimed in claim 1, wherein identifying the one or more keywords comprises:
converting, by the resource provisioning system, the voice-based user input into textual data; and
applying, by the resource provisioning system, an identifier on the textual data to identify the one or more keywords associated with a service requested for accessing the resources.

3. The method as claimed in claim 2, wherein converting the voice-based user input into the textual data is based on at least one of a Hidden Markov method, a Dynamic Time Warping (DTW) method, an artificial neural network, an end-to-end Automatic Speech Recognition (ASR) method, a deep feedforward network, and a Recurrent Neural Network (RNN).

4. The method as claimed in claim 2, wherein the identifier applied for identifying the one or more keywords comprises at least one of a Rapid Automatic Keyword Extraction (RAKE) method and a Key Phrase Extraction Algorithm (KEA).

5. The method as claimed in claim 1, wherein the one or more parameters comprises at least one of Central Processing Unit (CPU) count, Random Access Memory (RAM) size, hard disk size, security zone, active directory (AD) domain, server type, service level agreement (SLA), default username, and password.

6. The method as claimed in claim 1, wherein the one or more values of the one or more parameters are determined based on recommendation of a service provider associated with the optimized resources.

7. The method as claimed in claim 1, further comprising dynamically generating a workflow corresponding to the identified one or more keywords, wherein the workflow triggers the provisioning of the optimized resources.

8. A resource provisioning system for provisioning optimized resources in a cloud environment, the system comprising:
a processor; and
a memory communicatively coupled to the processor, wherein the memory stores processor-executable instructions, which, on execution, causes the processor to:
receive a voice-based user input for accessing resources in the cloud environment;
identify one or more keywords related to the resources from the voice-based user input;
determine automatically, one or more parameters and corresponding one or more values of the one or more parameters required for accessing the resources based on the one or more keywords;
populate one or more fields, corresponding to the one or more parameters, with the one or more values, wherein the one or more values indicates an optimal machine configuration of the resources; and
provision the optimized resources based on the populating of the one or more values in the one or more fields.

9. The resource provisioning system as claimed in claim 8, wherein the processor identifies the one or more keywords by:
converting the voice-based user input into textual data; and
applying an identifier on the textual data to identify the one or more keywords associated with a service requested for accessing the resources.

10. The resource provisioning system as claimed in claim 9, wherein the processor converts the voice-based user input into the textual data based on at least one of a Hidden Markov method, a Dynamic Time Warping (DTW) method, an artificial neural network, an end-to-end Automatic Speech Recognition (ASR) method, a deep feedforward network, and a Recurrent Neural Network (RNN).

11. The resource provisioning system as claimed in claim 9, wherein the identifier applied for identifying the one or more keywords comprises at least one of a Rapid Automatic Keyword Extraction (RAKE) method and a Key Phrase Extraction (KEA) method.

12. The resource provisioning system as claimed in claim 9 comprises a speech converter for converting the voice-based user input into the textual data.

13. The resource provisioning system as claimed in claim 8, wherein the one or more parameters comprises at least one of Central Processing Unit (CPU) count, Random Access Memory (RAM) size, hard disk size, security zone, active directory (AD) domain, server type, service level agreement (SLA), default username, and password.

14. The resource provisioning system as claimed in claim 8, wherein the one or more values of the one or more parameters are determined based on recommendation of a service provider associated with the optimized resources.

15. The resource provisioning system as claimed in claim 8, further dynamically generating a workflow corresponding to the identified one or more keywords, wherein the workflow triggers the provision of the optimized resources.

16. A non-transitory computer-readable storage medium including instructions stored thereon that when processed by at least one processor cause a resource provisioning system to perform operations comprising:

receiving a voice-based user input for accessing resources in the cloud environment;

identifying one or more keywords related to the resources from the voice-based user input;

determining automatically one or more parameters and corresponding one or more values of the one or more parameters required for accessing the resources based on the one or more keywords;

populating one or more fields, corresponding to the one or more parameters, with the one or more values, wherein the one or more values indicates an optimal machine configuration of the resources; and provisioning the optimized resources based on the populating of the one or more values in the one or more fields.

17. The medium as claimed in claim 16, wherein identifying the one or more keywords comprises:

converting the voice-based user input into textual data; and applying an identifier on the textual data to identify the one or more keywords associated with a service requested for accessing the resources.

18. The medium as claimed in claim 17, wherein converting the voice-based user input into the textual data is based on at least one of a Hidden Markov method, a Dynamic Time Warping (DTW) method, an artificial neural network, an end-to-end Automatic Speech Recognition (ASR) method, a deep feedforward network, and a Recurrent Neural Network (RNN).

19. The medium as claimed in claim 16, wherein the one or more values of the one or more parameters are determined based on recommendation of a service provider associated with the optimized resources.

20. The medium as claimed in claim 16, wherein the instructions further cause the at least one processor to dynamically generate a workflow corresponding to the identified one or more keywords, wherein the workflow triggers the provisioning of the optimized resources.

* * * * *